(12) United States Patent
Dang et al.

(10) Patent No.: US 10,569,256 B2
(45) Date of Patent: Feb. 25, 2020

(54) LOW COST OXIDATION CATALYSTS FOR VOC AND HALOGENATED VOC EMISSION CONTROL

(71) Applicant: Clariant Corporation, Louisville, KY (US)

(72) Inventors: Zhongyuan Dang, Prospect, KY (US); Greg Cullen, Amesbury, MA (US)

(73) Assignee: Clariant Corporation, Louisville, KY (US)

( * ) Notice: Subject to any disclaimer, the term of this patent is extended or adjusted under 35 U.S.C. 154(b) by 31 days.

(21) Appl. No.: 15/861,965

(22) Filed: Jan. 4, 2018

(65) Prior Publication Data

US 2018/0229220 A1 Aug. 16, 2018

Related U.S. Application Data

(60) Provisional application No. 62/458,695, filed on Feb. 14, 2017.

(51) Int. Cl.
*B01J 23/02* (2006.01)
*B01J 23/06* (2006.01)
(Continued)

(52) U.S. Cl.
CPC ............ *B01J 23/63* (2013.01); *B01D 53/864* (2013.01); *B01D 53/8662* (2013.01); *B01J 21/04* (2013.01); *B01J 21/063* (2013.01); *B01J 21/066* (2013.01); *B01J 21/08* (2013.01); *B01J 23/10* (2013.01); *B01J 23/462* (2013.01); *B01J 23/626* (2013.01); *B01J 35/04* (2013.01); *B01J 37/023* (2013.01); *B01D 2255/1021* (2013.01); *B01D 2255/1026* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/2094* (2013.01); *B01D 2255/20707* (2013.01); *B01D 2255/40* (2013.01); *B01D 2255/407* (2013.01); *B01D 2257/2062* (2013.01); *B01D 2257/502* (2013.01); *B01D 2257/708* (2013.01);
(Continued)

(58) Field of Classification Search
CPC .... B01D 53/864; B01D 53/8662; B01J 21/04; B01J 21/063; B01J 21/066; B01J 21/08; B01J 23/10; B01J 23/462; B01J 23/626; B01J 35/04; B01J 37/023
USPC ........................................................ 502/242
See application file for complete search history.

(56) References Cited

U.S. PATENT DOCUMENTS 4,059,676 A 11/1977 Yang
5,176,897 A 1/1993 Lester
(Continued)

OTHER PUBLICATIONS

Beatriz Miranda, Applied Catalysis B: Environmental 64 (2006) 262-271 "Performance of alumina-supported noble metal catalysts for the combustion of trichloroethene at dry and wet conditions".
(Continued)

*Primary Examiner* — Haytham Soliman

(57) ABSTRACT

The current embodiments relate to ruthenium-containing supported catalysts, including processes for their manufacture and use, which destroy, through catalytic oxidation, hazardous compounds contained in chemical industrial emissions and otherwise produced from industrial processes.

16 Claims, 3 Drawing Sheets

(51) Int. Cl.
*B01J 23/63* (2006.01)
*B01J 23/10* (2006.01)
*B01J 21/06* (2006.01)
*B01J 21/08* (2006.01)
*B01J 21/04* (2006.01)
*B01J 35/04* (2006.01)
*B01J 37/02* (2006.01)
*B01D 53/86* (2006.01)
*B01J 23/62* (2006.01)
*B01J 23/46* (2006.01)

(52) U.S. Cl.
CPC . *B01D 2257/7027* (2013.01); *B01J 2523/821* (2013.01); *B01J 2523/828* (2013.01); *Y02A 50/2341* (2018.01)

(56) References Cited

U.S. PATENT DOCUMENTS

| | | |
|---|---|---|
| 5,578,283 A | 11/1996 | Chen |
| 5,643,545 A | 7/1997 | Chen |
| 5,653,949 A | 8/1997 | Chen |
| 5,895,636 A | 4/1999 | Nguyen |
| 5,961,942 A | 10/1999 | Turner |
| 6,207,120 B1 | 3/2001 | Belmonte |
| 6,239,064 B1 | 5/2001 | Nguyen |
| 2004/0028589 A1* | 2/2004 | Reisinger ............ B01D 53/864 423/240 S |
| 2010/0266473 A1 | 10/2010 | Chen |
| 2011/0044874 A1* | 2/2011 | Dang ................... B01D 53/864 423/240 S |
| 2014/0255284 A1 | 9/2014 | Alden |

OTHER PUBLICATIONS

Tomohiro Mitsui, Applied Catalysis B: Environmental 81 (2008) 56-63 "Support effect on complete oxidation of volatile organic compounds over Ru catalysts".

Xiaolong Liu, Catal. Sci. Technol., 2016, 6, 4337 "Catalytic oxidation of methyl bromide using ruthenium-based catalysts".

* cited by examiner

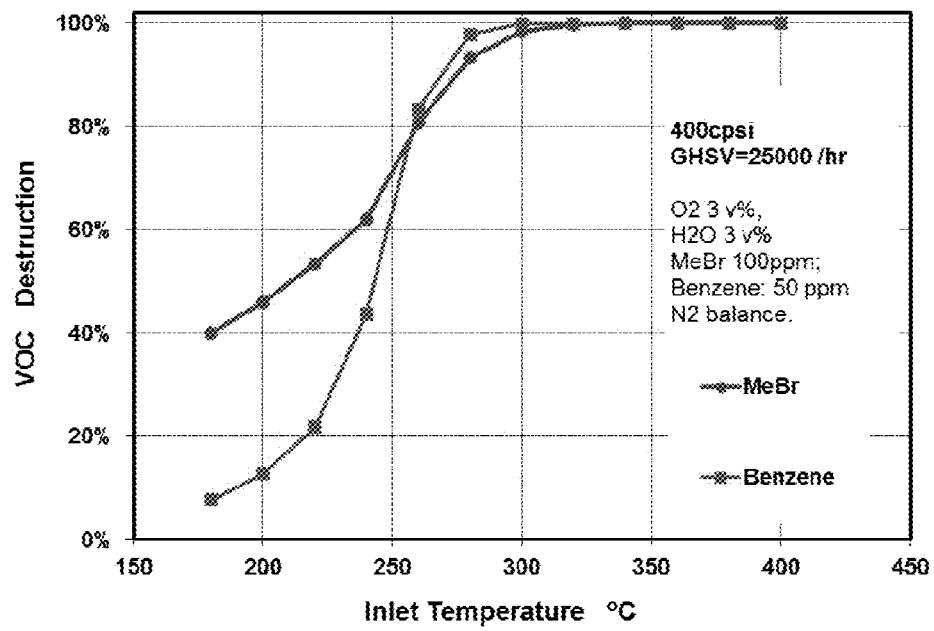
FIG. 2A refer example #1 catalyst sample
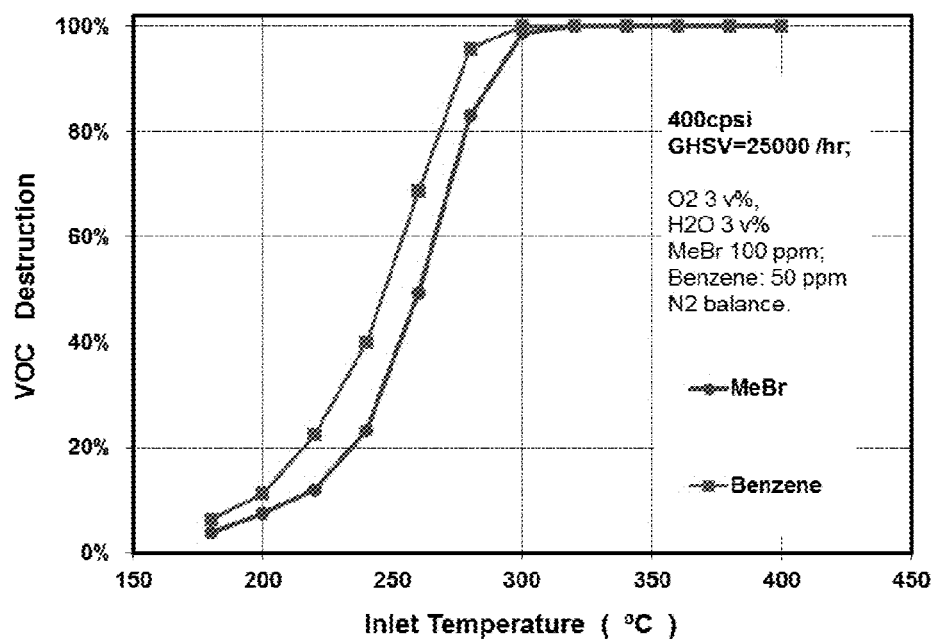
FIG. 2B refer example #2 catalyst sample.

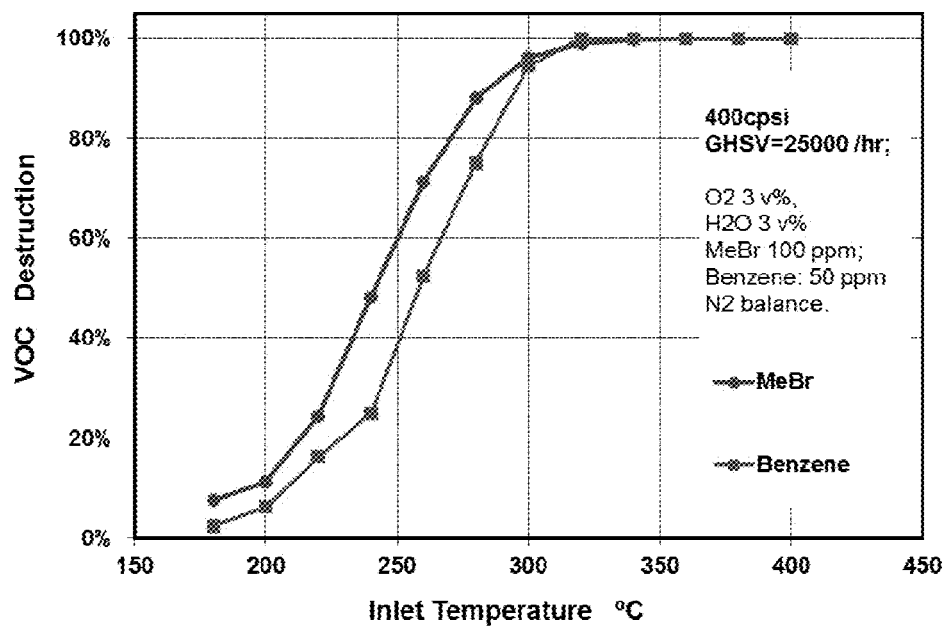
FIG. 2C refer example #3 catalyst sample
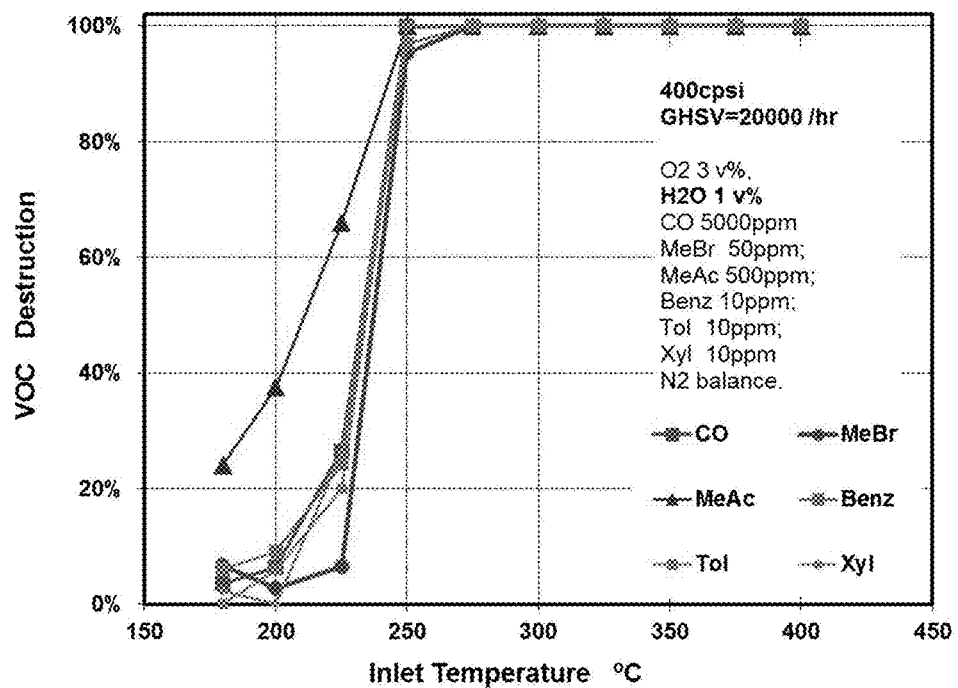
FIG. 2D refer example #4 simulated PTA off-gas destruction.

LOW COST OXIDATION CATALYSTS FOR VOC AND HALOGENATED VOC EMISSION CONTROL

This application claims the benefit of priority of U.S. Provisional Patent Application No. 62/458,695, filed Feb. 14, 2017, which is hereby incorporated herein by reference in its entirety.

FIELD OF INVENTION

Current embodiments relate to ruthenium-containing supported catalysts, including processes for their manufacture and use, which destroy, through catalytic oxidation, hazardous compounds contained in chemical industrial emissions and otherwise produced from industrial processes.

BACKGROUND

A number of hazardous compounds are found in the off-gas- and/or exhaust emissions of chemical, fuel-consuming and industrial processes. These may originate from industrial exhausts, and off-gas emissions from chemical plants, including purified terephthalic acid (PTA) plants. The hazardous compounds found in various kinds of emissions may be in the form of chemical by-products and solvents. Likewise, the hazardous compounds—including halogenated VOCs and other highly toxic pollutants—pose a number of deleterious effects to people and the environment, including respiratory problems, various cancers, smog, and ozone depletion. Further, using incineration to eliminate some of these compounds, such as certain halogenated compounds, might produce other toxic substances depending on the operating conditions. For these and other reasons involving public health and environmental considerations, local, regional or global regulations have required the elimination of these hazardous compounds.

Accordingly, the hazardous compounds contained in certain emissions, which the catalysts and processes of the current embodiments can be used to eliminate, generally include volatile organic compounds ("VOC"), halogenated volatile organic compounds ("HVOC"), and carbon monoxide ("CO"). In many cases, though not all cases, such compounds contain carbon and hydrogen, and may also contain other elements such as oxygen, nitrogen and halogen.

To date, various approaches have been used for eliminating these hazardous compounds, e.g., adsorption on carbon or other adsorbents, catalytic oxidation, and thermal oxidation (incineration). However, adsorption only concentrates the hazardous pollutants, without destroying them, and the effectiveness of the approach depends on fluctuations in concentration of the pollutants. Moreover, thermal oxidation is marked by high operating temperatures and substantial operating costs because these reactions require high temperatures—often exceeding 750° C. By comparison, catalytic oxidation reduces the activation energy needed to oxidize these hazardous compounds in the presence of oxygen, so it can be accomplished at a fraction of the energy required for thermal oxidation.

For brevity, compounds that can be destroyed with the inventive catalysts and processes disclosed herein are referred to as the "hazardous compounds." These include, but are not necessarily limited to carbon monoxide; VOCs such as benzene, toluene, xylene, methanol, and methyl acetate; and HVOCs such as chloromethane, dichloromethane, dichloroethane, bromomethane, dibromomethane, dibromoethane, and chlorobenzene, dichlorobenzene, and polybromobenzene, to name several. The inventive catalysts are used to reduce the activation energy needed for these reactions to occur, and are generally provided as a low-cost approach compared to other catalysts used for oxidation.

In general, catalysts that have been utilized for the oxidation reactions involved with destruction of the hazardous compounds have included platinum, palladium and rhodium on aluminum oxide ($Al_2O3$) supports. Such catalysts have taken various forms, such as tablets, pellets, spheres, and granules, as well as monolithic supports.

Because catalytic oxidation reactions are carried out at lower temperatures than thermal oxidation, it reduces operating costs, and provides other significant advantages for operations, including economic savings. But although catalytic oxidation is considered a viable approach, the use of expensive precious metal catalysts such as platinum and palladium limit the economic savings, and there is a desire for low cost catalyst having similar effectiveness. Further, catalysts that have been used previously for these purposes sometimes cost more, so there is a need for catalysts that provide a longer service life and lower the costs.

SUMMARY

Various oxidation catalysts, including precious metals, have been used previously for destruction of hazardous compounds at chemical plants which contained in various other kinds of harmful emissions. However, the high cost of large volumes of precious metal catalysts has proven prohibitive. Further, there is a desire for alternative catalysts that cost less but are similarly capable of destroying hazardous compounds from chemical plant emissions, for example in PTA production plants.

The ruthenium-containing catalysts disclosed herein offer cost advantages compared to precious metal catalysts. In some embodiments, the ruthenium catalysts are supported on stabilized high surface area solid solution or mixed oxides. Without limitation, a listing of these includes ceria-zirconia, titania-ceria, tin oxide-ceria, alumina-ceria, zirconia-silica, titania-silica, tin oxide-silica, and others described herein. In some embodiments, the inventive catalysts contain no precious metal catalysts such as platinum or palladium. Accordingly, cost-effective oxidation catalysts incorporated with monolithic supports are provided for destruction of emissions containing the hazardous compounds of interest. The destruction (i.e., elimination) of these hazardous compounds is thus accomplished at lower temperatures than with prior systems.

Multiple embodiments and alternatives include ruthenium catalysts supported on monolithic structures having multiple channels or cells, coated with high surface area mixed metal oxides or solid solution. The monolithic supports may be provided either as stand-alone support structures or as a series of channel-containing honeycombs, and they can be placed in a gas flow so that the channels are aligned generally parallel with the direction of flowing gas. In this way, hazardous compounds in emissions are destructed by contacting the catalysts within these channels. The catalytic structures of the present embodiments exhibit a high surface area for exposing the catalysts to the emissions. In some embodiments, the surface area of the supported catalyst is at least 60 $m^2/g$, preferably more than 100 $m^2/g$. The catalyst materials are coated within the channels of the monolithic substrates, and the catalysts themselves demonstrate good thermal stability relative to the energy required to initiate the catalyzed oxidation reactions.

Moreover, the cost-effective oxidation catalysts of present embodiments compare favorably with more expensive platinum group catalysts for eliminating the hazardous compounds described herein, as evidenced by light-off temperatures for eliminating certain hazardous compounds including HVOC. Thus, before certain off-gases containing these hazardous compounds are vented to atmosphere as emissions, the present embodiments enable them to be destroyed using the catalysts and processes described herein. Advantageously, the catalysts of present embodiments offer an improved balance of efficiency and low-cost application.

BRIEF DESCRIPTION OF DRAWINGS

FIGS. 2A-2D show the test results for catalytic oxidation in connection with supported ruthenium catalysts discussed in Examples 1-4, respectively.

MULTIPLE EMBODIMENTS AND ALTERNATIVES

Figure 1:
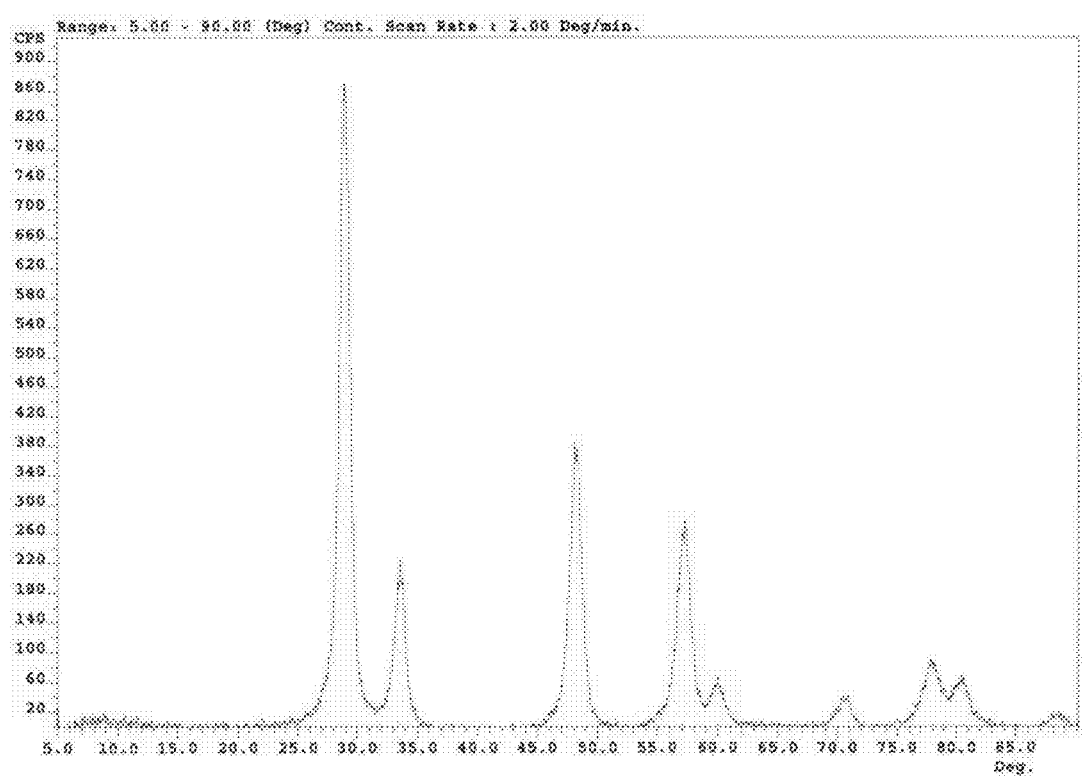
FIG. 1 is an x-ray diffraction readout for a ceria-zirconia solid solution, according to multiple embodiments and alternatives.

Multiple embodiments and alternatives include those having ruthenium catalysts coated on the interior walls or channels of monolithic supports. In some embodiments, high surface area refractory mixed oxides or solid solution are employed to support the ruthenium catalysts. Except where a specific form is provided, a reference to "metal oxide" herein is intended to include all oxide forms of such metal.

In some embodiments, the catalysts are supported on high surface area solid solution or refractory mixed metal oxides. A non-limiting listing of these would include ceria-zirconia, titania-ceria, tin oxide-ceria, alumina-ceria, silica-ceria, zirconia-silica, titania-silica, tin oxide-silica, and including three components combination, such as titania-ceria-silica, zirconia-ceria-silica; and tin oxide-ceria-silica, titania-zirconia-silica, alumina-ceria-silica.

In some embodiments, the high surface area mixed oxide compounds are stabilized further, by adding to the compounds one of more of the following, including combinations: alumina, silica, tin oxide, tungsten, ceria, and other rare earth oxides such as lanthanum (III) or praseodymium (III). Accordingly, multiple embodiments further include processes for forming these oxidation catalysts, in which the process is characterized by stabilizing the catalysts with high surface area solid solution or mixed oxides.

Present embodiments also encompass a process for modifying a flowing gas stream containing emissions, wherein monolithic supports bearing ruthenium catalysts are positioned in the stream so that generally the openings of the honeycomb are aligned parallel with the direction of flow. A non-limiting example of a suitable monolithic support is one having a cell density of 100-400 cpsi (cells per square inch). The temperature of the flowing gas stream is maintained at about 200° C. up to about 500° C., resulting in the elimination of the hazardous compounds that may be found in emissions.

In some embodiments, the catalyst materials are incorporated on flow through substrates (e.g., honeycomb, foam or other monolithic substrates) via wash-coating processes. As selectively achieved during the formation steps, the ruthenium loading varies in a range of about 0.1-5 g/L upon the monolithic structures, more preferring 1-3 g/L. In some embodiments, the support wash-coat materials ranges from about 30-300 g/L, more preferring 80-250 g/L.

It will be appreciated that the monolithic substrates themselves are comprised of inert materials, such as ceramic cordierite or aluminum mullite, as well as alloy material such as iron chromium aluminum alloy. While monolithic substrates are used in some embodiments, the substrates for the support of catalyst can also take the form of pellets, tablets, and spheres using the same type of coating processes described herein.

In some embodiments, catalyst materials are deposited on monolithic supports using a wash-coating process. The catalyst components are first mixed with water and binder materials and milled for a sufficient period of time to obtain a slurry with appropriate particle sizes. The monolithic substrates are then dipped into this slurry. As desired, excess slurry material is removed by vacuum suction or air knife, or the like. Subsequently, the coated substrates are dried and calcined at a temperature sufficient to secure the washcoat materials onto the substrates.

As mentioned, the solid solution or mixed oxides can be wash-coated onto the monolithic substrates prior to incorporating the ruthenium catalysts. In this regard, the solid solution or mixed oxides are first mixed with water and binder materials and milled for a sufficient period of time to obtain a slurry having desired particle sizes. The monolithic substrates are dipped into this slurry. As desired, excess slurry material is removed by vacuum suction or air knife, or the like. Subsequently, the coated substrates are dried and calcined. At this point, a solution of ruthenium having a ruthenium content sufficient to achieve ruthenium loading is deposited on the wash-coated monolithic substrates, through techniques that are known in the art, for example as by wetness impregnation or spraying. In some embodiments, the ruthenium solution is deposited as a ruthenium complex (precursor), at a concentration sufficient to achieve desired ruthenium loading on the support. Sources for suitable choices of ruthenium compound solution can be obtained from, without limitation, ruthenium alkoxides, ruthenium alkyls, ruthenium amidinates, ruthenium diketonates, and Trinitratonitrosylruthenium(II), Ruthenium acetate, Ruthenium(III) chloride hydrate, Ruthenium pentacarbonyl, Ruthenium(IV) oxide, Ruthenium(IV) oxide hydrate, Diruthenium nonacarbonyl, and Triruthenium dodecacarbonyl.

In practical application, the monolithic substrates which are wash-coated with catalyst materials, having been prepared according to the teachings herein, are placed in the emissions-containing exhaust flow device, where the catalytic oxidation destroys the hazardous compounds of interest. Exhaust gases containing these hazardous compounds will contact the catalyst materials, having been deposited on monolithic substrates. As this occurs with sufficient amounts of oxygen under normal operating conditions, and at temperatures from 200° C. to about 500° C., the hazardous compounds are oxidized and converted to carbon dioxide and water, along with halogen acid/halogens. A "light-off temperature" refers to the temperature at which the catalytic oxidation reaction occurs for a hazardous compound or a group of hazardous compounds. The inventive catalysts' favorable activity for oxidizing the hazardous compounds is marked by destruction of these compounds at favorable (i.e., lower) light-off temperatures than for thermal oxidation. In some cases, as seen in the examples, the light-off temperature for destroying a significant percentage of the hazardous compounds is about 250° C. or lower.

According to multiple embodiments and alternatives presented herein, supported ruthenium catalysts may further comprise high surface area solid solution of ceria-zirconia. Such inventive combinations include the cubic fluoride structure of a 5%-50% by weight zirconia into ceria as a stabilizing functionality. As desired, in some embodiments the solid solution is stabilized further by addition of rare earth elements such as lanthanum or praseodymium at a weight percentage of less than 5%.

In some embodiments, similar stabilizing features are realized with a solid solution or mixed oxides of titania-ceria by adding 5%-20% by weight ceria into titania. This combination provides a rutile structure or anatase structure, and is stabilized further as desired by addition of silica or tungsten. In some embodiments, similar stabilizing features are realized with a solid solution or mixed oxides of tin oxide-ceria by adding about 5%-20% by weight ceria into tin oxide This combination provides a rutile structure, and is stabilized further as desired by the addition of silica. In some embodiments, similar stabilizing features are realized with a solid solution or mixed oxides of alumina-ceria by adding about 5%-20% by weight ceria into alumina. This combination may provide a gamma alumina structure or amorphous structure, and is stabilized further as desired by the addition of silica.

In some embodiments, an additional component of the oxidation catalyst may be silica. Silica may be used as an alternative depending on the composition of the emissions stream. Thus, in some circumstances, silica is preferable. Alternatively, depending on the emissions stream, the oxidation catalyst may contain silica or in combination with silica.

The silica may be a precipitated silica powder which has an amorphous phase with a surface area more than 150 m2/g, a larger pore size greater than 100 angstrom, and a particle size average from 0.5 to 15 microns. Other types of amorphous silica, such as mesoporous molecular sieves MCM-41 and SBA-15, can be also used. These molecular sieves MCM-41 and SBA-15 also have large surface area, being greater than 200 m2/g, larger pore volumes and uniform pore-size distributions of more than 100 angstrom, thereby allowing for higher dispersions of active components and better control on the particle size, as compared with conventional amorphous silica. Fumed silica, that may have larger surface area, is less desirable as a catalyst support due to its low porosity. Silica has significantly lower surface acidity that leads to very weak capability to adsorb halogenated compounds, which may result in poisoned catalysts.

In terms of processes that utilize the low cost catalysts, in some embodiments the inventive catalysts are operated at a Gas Hour Space Velocity (GHSV) between about 1,000-100,000 $h^{-1}$ more preferring between about 5000-50,000 $h^{-1}$. It will be appreciated that for a given operation, space velocity can be optimized by increasing or decreasing the catalyst volumes within the reactors where the catalytic oxidation is occurring.

Moreover, inventive catalysts or catalyst systems can operate within a wide temperature window. Typically, operating temperatures are seen in a range from about 200° C. to about 500° C., and in some embodiments these operating temperatures will range from 230° C. to 400° C., or more particularly between 240° C. to 350° C. Inventive catalysts can be used to achieve complete or near complete catalytic oxidation of compounds from chemical plant off-gas emissions, provided sufficient amount of oxygen exists where the oxidation reactions are occurring. In some embodiments, operating temperatures can be further influenced by injecting a sufficient amount of an assisting fuel, which are organic compounds that are more easily volatilized, into the off-gas exhaust stream. Non-limiting examples of appropriate assisting fuels include methanol, ethanol, methyl acetate, synthetic gas, and mixtures thereof, which are readily available in chemical plants.

Besides operating at a suitable GHSV and within desirable temperature windows, the inventive catalysts generally operate within environments that are low pressure or high pressure reactor systems. In some embodiments, working pressure might range from atmospheric to about 300 psi (2.0 MPa). In high pressure operations, more particularly between about 100-200 psi (0.6-1.4 MPa), the catalytic oxidation reactor can be positioned upstream of the off-gas expander. Alternatively, in low pressure operation a location downstream of the off-gas expander may be appropriate for positioning the catalytic oxidation reactor. What follows are non-limiting examples related to both inventive catalysts and processes for their manufacture and use, which are offered to further illustrate various embodiments according to the teachings herein.

EXAMPLES

It is to be understood that these examples are illustrative only and not to be construed as limiting the scope of the subject matter described and claimed herein. Examples 1-3 relate to obtaining various catalyst-bearing monolithic substrates, and testing their performance in terms of destroying hazardous compounds. Example 4 uses the catalyst of Example 1, but testing was performed on a different composite off-gas sample. Graphs for the composite samples, are provided in FIGS. 2A-2D, respectively.

Example 1

A wash coat slurry was prepared by solid solution of ceria-zirconia powder (see FIG. 1) and silica at a ratio of 5:1, with sufficient amounts of deionized water. The ceria-zirconia powder had a surface area of about 85 $m^2/g$. Upon mixing, the slurry was milled to a desired particle size. A ceramic monolithic substrate part having a cell density of 400 cpsi was dipped into the wash-coat slurry. Excess slurry was removed using an air knife. The coated part was dried at about 150° C. and calcined at about 500° C., resulting in a part having a wash coat loading of about 170 g/L. Upon this coated part, a ruthenium nitrate solution was deposited by wetness impregnation, dried at 150° C. and calcined at 500° C., to achieve a ruthenium load of about 2.8 g/L as measured by known techniques.

Example 2

A wash coat slurry was prepared using silica stabilized titania powder, which had a surface area of about 85 $m^2/g$, silica colloid and sufficient amounts of deionized water, followed by milling the mixture to a desired particle size. A 400 cpsi monolithic substrate part was then dipped into the wash coat slurry. Excess slurry was removed using an air knife. The coated part was dried at 150° C. and calcined at 500° C. The resulting part had a wash-coat loading of about 180 g/L. Upon this coated part, the ruthenium nitrate solution was deposited by wetness impregnation, dried at 150° C. and calcined at 500° C., to achieve a ruthenium load of about 2.6 g/L.

Example 3

A wash coat slurry was prepared using silica stabilized tin oxide powder, which has a surface area of about 110 $m^2/g$, silica colloid and sufficient amounts of water, followed by milling the mixture to a desired particle size. A 400 cpsi monolithic substrate part is dipped into the wash coat slurry. Excess slurry is removed using vacuum suction or air knife. The coated part is dried at about 150° C. and calcined at 500° C. This results in a part having a wash coat loading of about 180 g/L. Upon this coated part, a ruthenium nitrate solution is deposited by wetness impregnation or other suitable techniques, dried at 150° C. and calcined at about 500° C., to achieve a ruthenium load of about 2.6 g/L.

The catalysts illustrated in the examples above were evaluated for catalytic activity. Reactivity based upon a core sample of the catalyst that was cut away from each of the above example catalyst monolith parts was tested on a lab-scale reactor. The hazardous compounds (i.e., emissions) tested were 50 ppm benzene, 100 ppm methyl bromide, 3 vol. % water (i.e., % by volume), 3 vol. % oxygen, and the balance as nitrogen. Testing was conducted at space velocity 25,000 $h^{-1}$.

Example 4

After obtaining the catalyst from Example 1, a mixed-gas composite of 5000 ppm carbon monoxide, 50 ppm methyl bromide, 500 ppm methyl acetate, 10 ppm benzene, 10 ppm toluene, 10 ppm's xylene, 1 vol. % water and 3 vol. % oxygen and nitrogen balance was tested as a simulated PTA plant off-gas, to determine the destruction efficiency of catalysts at space velocity of 20,000 $h^{-1}$. A heated flame ionization detection ("HFID") total hydrocarbon analyzer, and non-dispersive infrared ("NDIR")-carbon monoxide analyzers were used for monitoring the oxidation reactions. As shown in the graph presented in FIG. 2D, complete or near-complete VOC destruction occurred at about 250° C. In FIGS. 2A-2C, the results were similar in terms of lowering the temperature requirements, with substantial VOC destruction seen at about 250° C. or lower and complete or near-complete destruction at 300° C. or lower.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

The invention claimed is:

1. An oxidation catalyst for the destruction of CO and volatile organic compounds which may include halogenated organic compounds, from an emissions stream, the oxidation catalyst comprising:
ruthenium, without any other metal from platinum group metals;
a refractory oxides support, the support comprising a solid solution or mixed oxide; and
one or both of silica and tin oxide;
wherein the solid solution or mixed oxide is chosen from the group consisting of ZrO2-CeO2, TiO2-CeO2, SnO2-CeO2, and Al2O3-CeO3.

2. An oxidation catalyst for the destruction of CO and volatile organic compounds which may include halogenated organic compounds, from an emissions stream, wherein the oxidation catalyst comprises:
a refractory oxides support comprising a mixed oxide; and one or both of silica and tin oxide,
wherein the mixed oxide is chosen from the group consisting of $ZrO_2$—$CeO_2$, $TiO_2$—$CeO_2$, $SnO_2$—$CeO_2$, and $A_{12}O_3$—$CeO_3$ and the at least one platinum group metals comprises ruthenium and no other platinum group metal.

3. The oxidation catalyst of claim 2 deposited on a substrate having a honeycomb or a monolithic structure wherein the substrate is produced from the group consisting of cordierite, mullite, iron-chromium alloy and stainless steel.

4. The oxidation catalyst of claim 2 wherein the refractory oxides support is stabilized with silica or one or more rare earth metal oxides.

5. The oxidation catalyst of claim 4 wherein the rare earth oxides are selected from the group consisting of lanthanum, cerium, yttrium, praseodymium, neodymium, and mixtures thereof.

6. The oxidation catalyst of claim 2 wherein the oxidation catalyst comprises stabilized tin oxide having a surface area from 2 $m^2$/g to 200 $m^2$/g and a particle size of from 1 to 20 micrometers, or wherein the oxidation catalyst comprises stabilized titania having a surface area from 2 $m^2$/g to 200 $m^2$/g and a particle size of from 0.2 to 20 micrometers.

7. The oxidation catalyst of claim 3 wherein the ruthenium metal is deposited on the substrate at a loading that comprises from 0.3 g/L to 5 g/L.

8. The oxidation catalyst of claim 2 wherein the oxidation catalyst comprises silica, which comprises from 5% to 50%, by weight, of the oxidation catalyst.

9. The oxidation catalyst of claim 2 wherein the oxidation catalyst comprises silica selected from the group consisting of amorphous silica, precipitated silica, molecular sieves, MCM-41, SBA-15, and combinations thereof.

10. The oxidation catalyst of claim 2 wherein the oxidation catalyst comprises silica comprising amorphous silica with a surface area more than 100 $m^2$/g and a particle size from 0.5-20 micrometers.

11. The oxidation catalyst of claim 2 wherein the refractory metal oxides comprise from 10% to 95%, by weight of the oxidation catalyst.

12. The oxidation catalyst of claim 1 deposited on a substrate having a honeycomb or a monolithic structure wherein the substrate is produced from the group consisting of cordierite, mullite, iron-chromium alloy and stainless steel.

13. The oxidation catalyst of claim 12 wherein the ruthenium metal is deposited on the substrate at a loading that comprises from 0.3 g/L to 5 g/L.

14. The oxidation catalyst of claim 1 wherein the refractory oxides support is stabilized with silica or one or more rare earth metal oxides.

15. The oxidation catalyst of claim 14 wherein the rare earth oxides are selected from the group consisting of lanthanum, cerium, yttrium, praseodymium, neodymium, and mixtures thereof.

16. The oxidation catalyst of claim 1 wherein the refractory metal oxides comprise from 10% to 95%, by weight of the oxidation catalyst.

\* \* \* \* \*